United States Patent
Wiklander

(10) Patent No.: US 12,449,815 B2
(45) Date of Patent: Oct. 21, 2025

(54) SYSTEM FOR OPERATING VEHICLES AT A WORK SITE

(71) Applicant: VOLVO AUTONOMOUS SOLUTIONS AB, Gothenburg (SE)

(72) Inventor: Jimmie Wiklander, Västerås (SE)

(73) Assignee: VOLVO AUTONOMOUS SOLUTIONS AB, Gothenburg (SE)

( * ) Notice: Subject to any disclaimer, the term of this patent is extended or adjusted under 35 U.S.C. 154(b) by 217 days.

(21) Appl. No.: 17/658,939

(22) Filed: Apr. 12, 2022

(65) Prior Publication Data
US 2022/0334590 A1    Oct. 20, 2022

(30) Foreign Application Priority Data
Apr. 16, 2021 (EP) .................................. 21168965

(51) Int. Cl.
*B60R 9/00* (2006.01)
*B60R 25/24* (2013.01)
*E02F 9/20* (2006.01)
*G05D 1/00* (2006.01)

(52) U.S. Cl.
CPC ............ *G05D 1/0276* (2013.01); *B60R 25/24* (2013.01); *E02F 9/205* (2013.01); *B60R 2325/205* (2013.01)

(58) Field of Classification Search
CPC ................................................ B60R 25/24
USPC ........................................................ 701/24
See application file for complete search history.

(56) References Cited

U.S. PATENT DOCUMENTS

| | | | | |
|---|---|---|---|---|
| 2008/0077299 | A1* | 3/2008 | Arshad | E02F 9/003 701/50 |
| 2012/0025964 | A1 | 2/2012 | Beggs et al. | |
| 2013/0301829 | A1* | 11/2013 | Kawamura | H04L 9/083 380/44 |
| 2016/0348504 | A1* | 12/2016 | Hanski | E02F 9/205 |
| 2016/0362084 | A1 | 12/2016 | Martin et al. | |
| 2017/0259762 | A1 | 9/2017 | Zoeller et al. | |
| 2017/0261978 | A1 | 9/2017 | Gresch | |
| 2018/0210440 | A1* | 7/2018 | Matsuzaki | G05D 1/0027 |

(Continued)

FOREIGN PATENT DOCUMENTS

| | | |
|---|---|---|
| CN | 106030432 A | 10/2016 |
| CN | 106654942 A | 5/2017 |

(Continued)

OTHER PUBLICATIONS

European Search Report dated Oct. 1, 2021 in corresponding European Patent Application No. 21168965.8, 8 pages.

(Continued)

*Primary Examiner* — Helal A Algahaim
*Assistant Examiner* — Michael T Dowling
(74) *Attorney, Agent, or Firm* — Venable LLP; Jeffri A. Kaminski

(57) ABSTRACT

A control system operates multiple vehicles at a work site, including a first, a second and a third vehicle. The system has a control unit that is configured to establish a first communication connection with each of the vehicles and a second communication connection with a safety key, allowing vehicle operation only while the second connection is active. The control system enhances safety by acting as a kill switch, stopping vehicle operation if the safety key connection is disrupted.

11 Claims, 3 Drawing Sheets

(56) References Cited

U.S. PATENT DOCUMENTS

| | | | |
|---|---|---|---|
| 2018/0356837 A1 | 12/2018 | Lisewski et al. | |
| 2019/0137999 A1* | 5/2019 | Taguchi | G05D 1/227 |
| 2020/0134955 A1* | 4/2020 | Kishita | G07C 5/008 |
| 2021/0078601 A1* | 3/2021 | Sugano | G05D 1/0297 |

FOREIGN PATENT DOCUMENTS

| | | | |
|---|---|---|---|
| CN | 108345299 A | 7/2018 | |
| CN | 110770407 A | 2/2020 | |
| EP | 3105646 A1 | 12/2016 | |
| EP | 3352036 A1 | 7/2018 | |
| JP | 2000318481 A | 11/2000 | |
| WO | 2015120905 A1 | 8/2015 | |

OTHER PUBLICATIONS

European Office Action dated Jan. 19, 2024 in corresponding European Patent Application No. 21168965.8, 4 pages.
European Office Action dated Jul. 27, 2023 in corresponding European Patent Application No. 21168965.8, 6 pages.
Chinese Office Action dated Sep. 13, 2024 in corresponding Chinese Patent Application No. 202210364095.X, 34 pages.

* cited by examiner

SYSTEM FOR OPERATING VEHICLES AT A WORK SITE

TECHNICAL FIELD

The present disclosure relates to a control system adapted to control an operation of a first and a second vehicle operating at a work site. The present disclosure also relates to a corresponding computer implemented method and to a computer program product.

BACKGROUND

In connection with transportation of e.g. loads at construction site or the like, working machines in the form of articulated haulers, wheel loaders, trucks or dumpers are frequently used. In its simplest configuration, the machines are arranged to load a platform of the vehicle, or a container or the like arranged on the platform of the vehicle, at a loading position of the construction site and drive to an unloading position of the construction site, located at a distance from the loading position, where it unloads the platform of the vehicle.

Recently there have been great advances in the semi and fully autonomous operation of such working machines, effectively providing operator assistance and safety functions, such as general obstacle detection, pedestrian detection, front and rear collision warning between working machines, etc. Such a working machine typically makes use of a plurality of sensors that are configured to detect information about an environment surrounding the vehicle.

An example of an interesting solution in this regard is presented in US20120025964, disclosing a methodology for presenting warnings in potentially dangerous areas in a vicinity of a vehicle. Specifically, US20120025964 suggests means for allowing both passive and warning, where an active warning is formed by correlating pedestrian detection in a potentially dangerous area in relation to the vehicle. US20120025964 further suggests presenting warnings by means of at one or a combination of audio and illumination means.

Even though the solution proposed in US20120025964 greatly reduces the risks for pedestrians or workers arranged in the close vicinity to a single vehicle, US20120025964 clearly fails to take into the complex situation as is present at a work site where e.g. more than a single vehicle is collaborating to perform a work task and where it potentially may be both autonomously and manually (human) operated working machines performing a collaborative operation. As such, there appears to be room for further improvements, further enhancing the personal safety for said worker or pedestrian.

SUMMARY

According to an aspect of the present disclosure, the above is at least partly alleviated by a control system adapted to control an operation of a first and a second vehicle operating at a work site, the control system comprising a control unit, wherein the control unit is adapted to establish a first communication connection with the first and the second vehicle, establish a second communication connection with a safety key, and allow the first and the second vehicle to perform a first mission at the work site, wherein the first and the second vehicle are only allowed to perform the first mission while the second communication connection is established between the safety key and the control unit.

The overall idea with the present disclosure is to implement a scheme for reducing the risk of unwanted and/or undeliberate operation of vehicles at a work site, by introducing a so called "safety key" that will function as a "main switch" for vehicle operation at the work site. Specifically, in case the (second) communication connection between the vehicles and the has failed, then the vehicles are disallowed from performing the first mission, for example until the communication connection again has been established. An advantage following the present disclosure is thus an improved security when vehicles are operating at a work site. This is specifically apparent in situations where both autonomously and manually operated working machines are working together at a work site, and possibly a driver/operator of one of the vehicles must move around at the work site outside of his vehicle.

As define in accordance to the present disclosure, a first communication connection is established between the control unit and each of the first and the second vehicle. A second communication connection is also established between the control unit and the safety key. It is thus possible for e.g. the driver/operator to "carry around" the safety key when moving around at the work site, and then only allow the second communication connection to be established between the safety key and the control unit when he is safely positioned within e.g. one of the first and the second vehicle, or within a safe control location separate from the first and/or the second vehicle. When the driver/operator needs to move within a proximity of the first and/or the second vehicle he may then cancel the second communication connection between the safety key and the control unit, and each of the first and the second vehicle will stop operation according to the first mission. As will be apparent, the solution according to the present disclosure will greatly reduce the time needed to be spent to activate/deactivate missions at a work site. Deactivating the second communication connection between the safety key and the control unit will thus function as a "kill switch" to ensure that the vehicles at the work site are safe to move around for a human operator.

The expression "safety key" should within the context of the present disclosure be interpreted broadly, and it thus not necessarily a physical "switch". Rather, it may be desirable to implement the safety key as a physical key, a key fob, a smartcard, a smart phone comprising a site-specific certificate, thus typically provided as an entity that the driver/operator easily can carry around the work site while at the same time being easy to use when the second communication connection is to be established with the control unit. It may, depending on the type of safety key that is used, be suitable to provide a "safety key reader" matching the technology used for the selected safety key.

The solution according to the present disclosure is thus easy to scale also for a situation where the work site comprises a large number of vehicles, such as more than two vehicles. The solution according to the present disclosure will also be suitable for use in case of the vehicles being differently operated, i.e. where the work site comprises both manually operated and autonomously operated vehicles.

Within the context of present disclosure, it should be understood that the expression "communication connection" (first as well as the second communication connection) should be interpreted broadly and may relate to any form of a set of information that is to be transmitted between the vehicles and the control unit. In a typical implementation at least part of the transmission of information between the vehicles and the control unit is in wireless form, using any form of known of future communication protocol. In some embodiments it may however be desirable to allow at least the second communication connection to be wired, i.e. between the control unit and the safety key.

Furthermore, the expression "first mission" should be understood to relate to one or a set of tasks to be performed by the first and the second vehicle at the work site. For example, the first mission may be to transport something from a first to a second position at the work site. Further examples include a situation where the first vehicle is used for loading something to e.g. a loading bed of the second vehicle. The first mission may be performed fully manually, in a fully autonomous manner, or by combining manually (human operated) tasks together with autonomous tasks.

In some embodiments it may be desirable to also limit the allowability for the first mission to be performed by only allowing the first mission to be performed while the first communication connection is established with the control unit. Accordingly, the vehicles must in such an embodiment always have an established communication with the control unit to be allowed to perform the first mission. However, at a work site it may be possible that such a communication (i.e. the first communication connection between the control unit and each of the first and the second vehicle) is sometime at least partly disrupted for a shorter or longer period and depending on the type of communication protocol used for the first communication connection. Accordingly, it may in some embodiments be possible to allow the first mission to be continued for at least a (short) predetermined period. In case the operator/driver then is to move (e.g. by foot) around the first and/or the second vehicle, he may just wait for the predetermined period and he will then know that the first and/or the second vehicle has stopped the first mission. In some embodiments the predetermined time period is set to be between 0.2 seconds and 5 minutes.

The control unit may in some embodiments be adapted to identify a re-established communication between the first/second vehicle and the control unit. Accordingly, in case the first communication connection is re-established it may be possible to automatically allow the first mission to proceed. As an alternative, the driver/operator in charge and handling the safety key may be requested (e.g. using a user interface) to manually re-activate the first mission.

It also, and within the scope of the present disclosure, be possible to include geographical constrains in the predetermined time, where an in comparison longer distance between the first/second vehicle and the control unit could allow for an in comparison linger predetermined time. Accordingly, each of the first and the second vehicles may in such an embodiment comprise a geolocation arrangement provided for determining an intermediate location of the first/second vehicle. Such a geolocation arrangement may for example comprise a GPS receiver or a local positioning arrangement at the work site, such as for example a Wi-Fi™ positioning system. It may, as understood by the skilled addressee, be necessary to use an alternative to satellite navigation in case the vehicles are operating underground, such as for example in a mine or similar. In some embodiments, for example when the geolocation arrangement is expected to have an in comparison high reliability, to allow the first safety position to correspond to the first location.

To further increase the safety at the work site it may be possible to dictate that only one single safety key is available for each work site. By means of such a limitation it is possible to ensure that only the person (human) with direct availability to the safety key can "activate" the vehicles at the work site.

Furthermore, it should be understood that the control system may be arranged at a site control location, such as for example an overall control facility for the work site. In such a case the safety key is typically engaged with the control unit at the site control location. However, as an alternative the control system may possibly be arranged as an onboard component of a third vehicle also arranged at the work site. The driver/operator will then typically be operating the third vehicle, and the safety key is engaged with the control unit at the third vehicle.

In a preferred embodiment the vehicles are working machines. Such working machines may for example include any form of mobile equipment used at a work site. The vehicles may furthermore be at least one of a pure electrical vehicle (PEV) and a hybrid electric vehicle (HEV).

In a preferred embodiment the vehicles are semi- and or fully autonomous vehicles, as will be further elaborated below in relation to the detailed description. It should however be understood that the vehicles may be vehicles operated by a human.

In some implementations the control unit forms part of a common server arranged remotely from the first and the second vehicle. Such a server may for example be a work site server. That said, in some other embodiments the control unit is provided as an onboard component of the second vehicle.

The control system as discussed above preferably forms part of a work site arrangement, further comprising the first and the second vehicle.

According to another aspect of the present disclosure there is provided a computer implemented method for controlling an operation of a first and a second vehicle operating at a work site, wherein the method comprises the steps of establishing a first communication connection between a control unit and the first and the second vehicle, establishing a second communication connection between the control unit and a safety key, and instructing, using the control unit, the first and the second vehicle to perform a first mission at the work site, wherein the first and the second vehicle are only allowed to perform the mission while the second communication connection is established between the safety key and the control unit. This aspect of the present disclosure provides similar advantages as discussed above in relation to the previous aspect of the present disclosure.

According to a further aspect of the present disclosure there is provided a computer program product comprising a non-transitory computer readable medium having stored thereon computer program means for operating a control system adapted to control an operation of a first and a second vehicle operating at a work site, the system comprising a control unit, wherein the computer program product comprises code for establishing a first communication connection between the control unit and the first and the second vehicle, code for establishing a second communication connection between the control unit and a safety key, and code for instructing, using the control unit, the first and the second vehicle to perform a first mission at the work site, wherein the first and the second vehicle are only allowed to perform the mission while the second communication connection is established between the safety key and the control unit. Also this aspect of the present disclosure provides similar advantages as discussed above in relation to the previous aspects of the present disclosure.

The computer readable medium may be any type of memory device, including one of a removable nonvolatile random-access memory, a hard disk drive, a floppy disk, a CD-ROM, a DVD-ROM, a USB memory, an SD memory card, or a similar computer readable medium known in the art.

Further advantages and advantageous features of the present disclosure are disclosed in the following description and in the dependent claims.

BRIEF DESCRIPTION OF THE DRAWINGS

With reference to the appended drawings, below follows a more detailed description of embodiments of the present disclosure cited as examples.

In the drawings.

DETAILED DESCRIPTION

Figure 1:
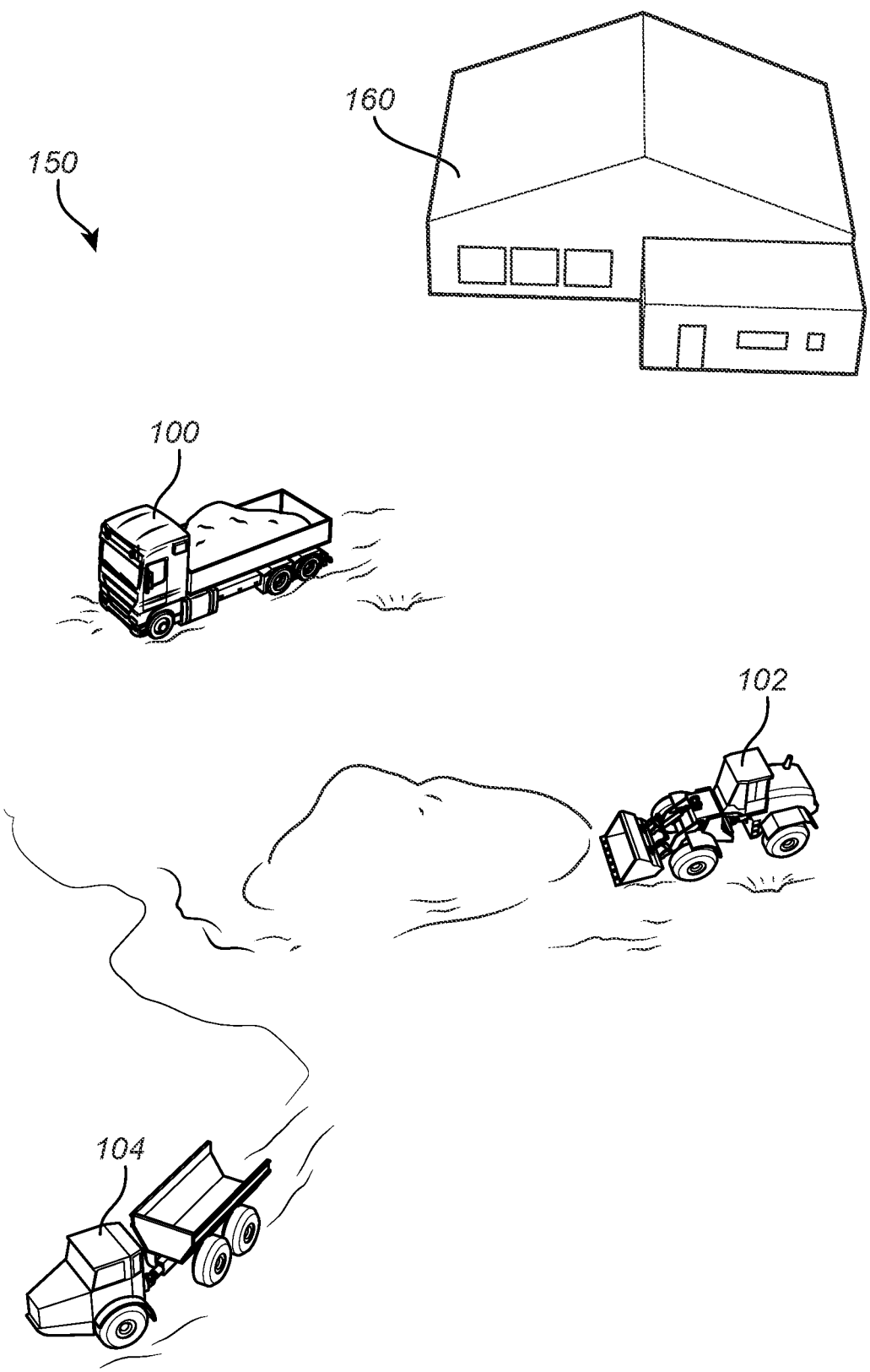
FIG. 1 illustrates a truck, a wheel loader and an articulated hauler allowed to selectively move around a work site.

The present disclosure will now be described more fully hereinafter with reference to the accompanying drawings, in which currently preferred embodiments of the present disclosure are shown. This disclosure may, however, be embodied in many different forms and should not be construed as limited to the embodiments set forth herein; rather, these embodiments are provided for thoroughness and completeness, and fully convey the scope of the disclosure to the skilled addressee. Like reference characters refer to like elements throughout.

Figure 2:
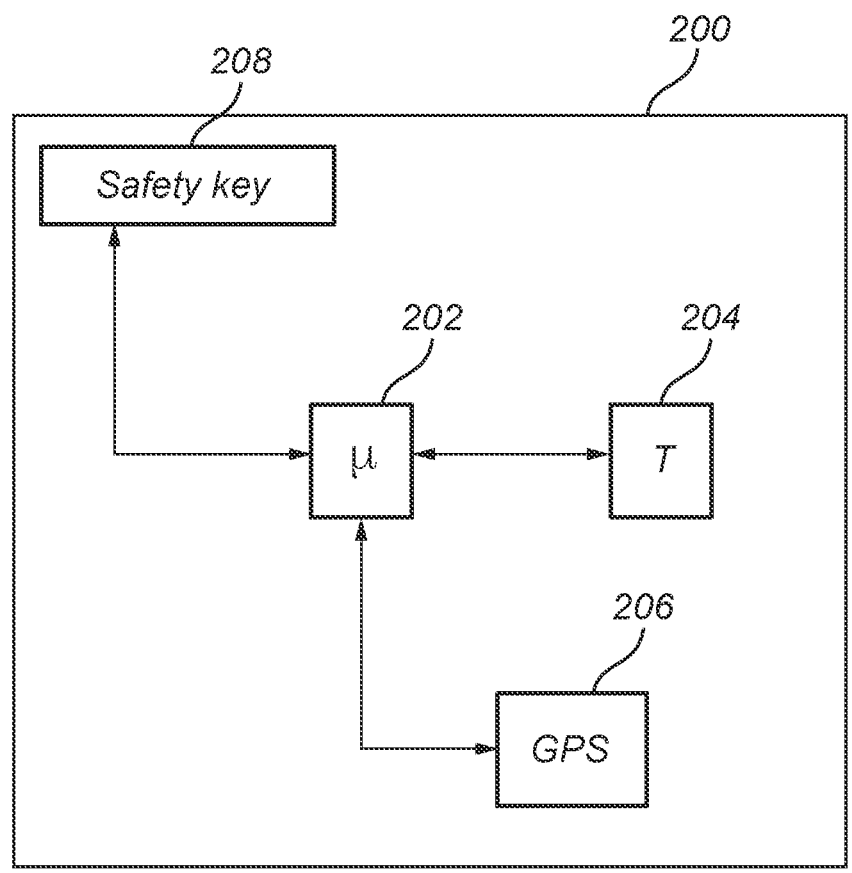
FIG. 2 illustrates a conceptual control system in accordance to a currently preferred embodiment of the present disclosure for controlling the vehicle movement at the work site.

Referring now to the drawings and to FIGS. 1 and 2 in particular, there is depicted a work site 150 where exemplary vehicles, here illustrated as a truck 100, a wheel loader 102 and an articulated hauler 104 are operating. The operation of the vehicle 100, 102 and 104 at the work site 150 is under the control of a control system 200. The concept in line with the present disclosure may also be used in relation to any other form of movable equipment operating at a work site, such as e.g. a car, a bus, any form of construction equipment, etc.

The vehicle may for example be one of an electric or hybrid vehicle, or possibly a gas, gasoline or diesel vehicle. The vehicle comprises an electric machine (in case of being an electric or hybrid vehicle) or an engine (such as an internal combustion engine in case of being a gas, gasoline or diesel vehicle). The vehicle may further be manually operated, fully or semi-autonomous.

FIG. 2 shows a conceptual and exemplary implementation of the control system 200, comprising a control unit 202 adapted for implementing the present scheme of controlling movement of e.g. the vehicles 100, 102, 104 at the work site 150. The control system 200 further comprises a transceiver 204 connected to the control unit 202, allowing communication to take place with vehicles at the work site 150, such as e.g. the truck 100, the wheel loader 102 and the articulated hauler 104. The vehicles 100, 102, 104 thus comprises corresponding transceiver means for allowing communication with the control system 200. The communication between the control unit 202 and the vehicles 100, 102, 104 is below defined as a first communication connection.

The first communication connection between the control unit 202 and the vehicles 100, 102, 104 (i.e. including the first and the second vehicle as defined above) is preferably performed in a wireless manner. For example, the first communication connection is a wireless network communication using any form of known or future communication protocol. Possible known communication protocol that may be used include e.g. a vehicle to infrastructure (V2I) connection, device-to-device (D2D) communication techniques are also possible. However, one exemplary existing technique that is specifically suitable for V2I applications is the IEEE standard 802.11p, based on the PHY and MAC layer of 802.11, i.e. OFDM and CSMA, respectively. Data broadcasts of IEEE 802.11p include information related to the position of the source, e.g. a vehicle. OFDM and CSMA refer to Orthogonal Frequency Division Multiplex and Carrier Sensing Multiple Access, respectively. It may however also or additionally be possible to use network communications using e.g. one of satellite, Wi-Fi™ radio service, or any form of cellular signals.

The control system 200 may be positioned locally at the work site 150, such as at a site control location 160. The site control location 160 may in some embodiments be a facility where human operators may be positioned and are controlling the vehicles 100, 102, 104, e.g. in case at least some of the vehicles 100, 102, 104 are autonomous vehicles. The control system 200 may as an alternative be comprised with one of the vehicles, such as the wheel loader 102. The wheel loader 102 may in such an embodiment be a manually operated vehicle, and the truck 100 and the articulated hauler 104 could be autonomous vehicles.

In a further alternative embodiment, the control system 200 is implemented as part of a server. The server could possibly be a so-called cloud server. As such, the server must not necessarily be arranged adjacently to the work site but may be arranged essentially at any position for performing the concept according to the present disclosure, as long as the server may communicate with the first and the second vehicle. It may however be preferred to arrange the control system 200 (or server) at the work site, thereby possibly minimizing communication disruptions, since possibly the first and the second vehicle may be directly connected to the control system 200 (or server).

For reference, the control unit 202 may in turn be manifested as a general-purpose processor, an application specific processor, a circuit containing processing components, a group of distributed processing components, a group of distributed computers configured for processing, a field programmable gate array (FPGA), etc. The processor may be or include any number of hardware components for conducting data or signal processing or for executing computer code stored in memory. The memory may be one or more devices for storing data and/or computer code for completing or facilitating the various methods described in the present description. The memory may include volatile memory or non-volatile memory. The memory may include database components, object code components, script components, or any other type of information structure for supporting the various activities of the present description. According to an exemplary embodiment, any distributed or local memory device may be utilized with the systems and methods of this description. According to an exemplary embodiment the memory is communicably connected to the processor (e.g., via a circuit or any other wired, wireless, or network connection) and includes computer code for executing one or more processes described herein.

As indicated above, it may be desirable to equip the vehicle in communication with e.g. a radionavigation system, for example including a GPS receiver 206 to determine an intermediate geographical location of the vehicles 100, 102, 104. Depending on where the control system 200 is arranged, also the control system 200 may be equipped with a GPS receiver 206. The GPS receiver 206 is then arranged in communication with the control unit 202 and may be used by the control unit 202 for determining an intermediate distance between the control system 200 and each of the vehicles 100, 102, 104.

Furthermore, the control system 200 also comprises a safety key 208. The safety key 208 is, in accordance to the present disclosure, used by the control system 200 to control the operation of the vehicles 100, 102, 104. The safety key 208 is as shown in FIG. 2 connected to the control unit 202. The connection is in the following defined as a second communication connection. It should be understood that the second communication connection may be wireless as defined above in relation to the first communication connection. However, the second communication connection may also be wired. Possibly, the control system 200 is provided with an interface where the safety key 208 is to be "inserted", similar to a physical key being inserted in a "lock". However, the safety key 208 may also be provided as a "tag" or comprised with e.g. a mobile phone (not shown). Accordingly, the second communication connection may be provided in any way suitable for connecting the safety key 208 to the control unit 202.

Figure 3:
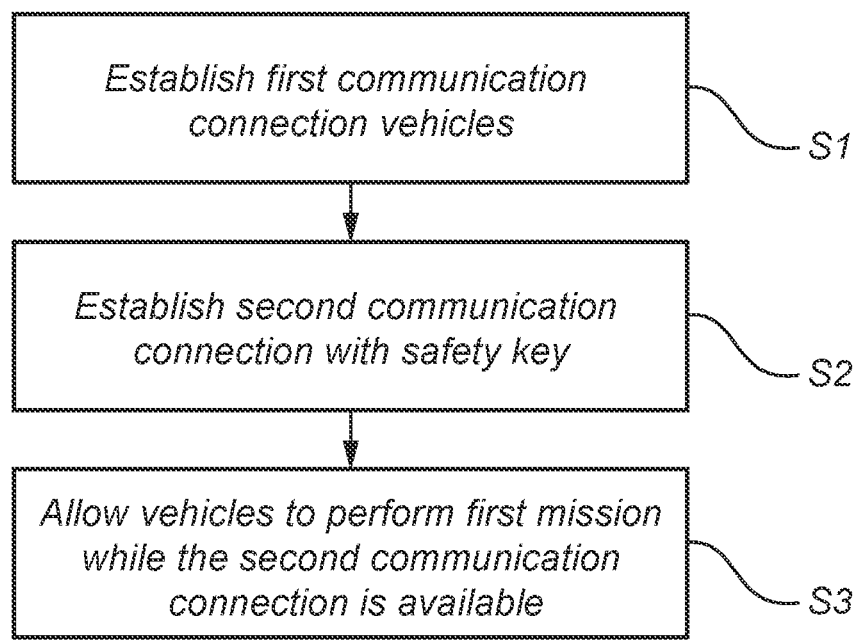
FIG. 3 illustrates the processing steps for performing the method according to the present disclosure.

During operation of the control system, with further reference to FIG. 3, the process starts by establishing, S1, the first communication connection between the control unit 202 and vehicles 100, 102, 104. The control system 200 is in the following arranged at the site control location 160 located at the work site 150, where at least one operator is to be positioned.

When the operator has determined e.g. that he and other humans/animals are arranged away from the vehicles 100, 102, 104, then he may decide that it is safe to allow the vehicles 100, 102, 104 to operate at the work site. At such a time he may establish the second communication, S2, connection between the control unit 202 and the safety key 208. As discussed above, this may be achieved by inserting the safety key 208 at a dedicated interface arranged in connection with the control unit 202. Alternatively, the operator may use his mobile phone (not shown) and a dedicated application executed at the mobile phone for establishing the second communication connection between the control unit 202 and the safety key 208.

Once both the first and the second communication connection has been established, the control unit 202 can automatically instruct, S3, the vehicles 100, 102, 104 to perform a first mission. The first mission may include separate instructions to each of the vehicles 100, 102, 104 for each performing a separate task, or to together perform a task. However, in accordance to the present disclosure, the first mission is only allowed to proceed as long as the second communication connection is maintained.

Accordingly, as soon as the safety key 208 is disconnected from the control unit 202, the first mission is disrupted. Preferably, the first mission is immediately disrupted, meaning that a moving vehicle is directly stopped. However, it goes without saying that stopping a vehicle should be performed in a safe manner, meaning that the vehicle may slowly retard rather than performing a hard stop.

It may also be desirable to only allow the first mission to proceed as long as the first communication connection is maintained. For example, in a situation where the second communication connection is interrupted, for example due to a bad communication signal between a transceiver at one of the vehicles and the control unit 202, then all of the vehicles 100, 102, 104 will automatically stop performing the task(s) of the first mission. However, to reduce unwanted stoppage of the first task, it may be possible to allow the second communication connection to be shortly disrupted (e.g. for example between 0.2 seconds and 5 minutes), while still allowing the first mission to proceed. Such an implementation will generally provide for an increased stability in operation at the work site 150.

The present disclosure contemplates methods, devices and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor.

By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data that cause a general-purpose computer, special purpose computer, or special purpose processing machines to perform a certain function or group of functions.

Although the figures may show a specific order of method steps, the order of the steps may differ from what is depicted. In addition, two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps and decision steps.

Additionally, even though the disclosure has been described with reference to specific exemplifying embodiments thereof, many different alterations, modifications and the like will become apparent for those skilled in the art.

Variations to the disclosed embodiments can be understood and effected by the skilled addressee in practicing the claimed disclosure, from a study of the drawings, the disclosure, and the appended claims. Furthermore, in the claims, the word "comprising" does not exclude other elements or steps, and the indefinite article "a" or "an" does not exclude a plurality.

The invention claimed is:

1. A control system adapted to control an operation of a plurality of vehicles, including all of a first, a second and a third vehicle, each of the first, the second and the third vehicle comprising a transceiver, wherein the plurality of vehicles are arranged to operate at a work site, the first and the second vehicle being autonomous vehicles and the third vehicle being a manually operated vehicle, the control system comprising:
a control unit and a transceiver connected to the control unit, the control system is arranged as an onboard component of the third vehicle, wherein the control unit is adapted to:
establish a first communication connection between the transceiver connected to the control unit and each of the respective transceivers comprised in the plurality of vehicles, wherein the first communication connection is a wireless network communication,
establish a second communication connection between the control unit and a safety key, and
instruct the plurality of vehicles to perform a first mission at the work site,
wherein:
the plurality of vehicles are configured to only perform the first mission while the second communication connection is established between the safety key and the control unit, and
only a single safety key is available for all of the plurality of vehicles arranged at the work site.

2. The control system according to claim 1, wherein the plurality of vehicles are further configured to only perform the first mission while the first communication connection is established with the control unit.

3. The control system according to claim 1, wherein the plurality of vehicles are further configured to only perform the first mission as long as a communication disruption between each of the first and the second vehicle and the control unit is less than a predetermined time period.

4. The control system according to claim 3, wherein the predetermined time period is between 0.2 seconds and 5 minutes.

5. The control system according to claim 1, wherein the safety key is selected from a group comprising a physical key, a key fob, a smartcard, a smart phone comprising a site-specific certificate.

6. A work site arrangement, comprising:
the control system according to claim 1, and
the first and the second vehicle.

7. A computer implemented method for controlling an operation of a plurality of vehicles, including all of a first, a second and a third vehicle, wherein the plurality of vehicles are arranged to operate at a work site, the first and the second vehicle being autonomous vehicles and the third vehicle being a manually operated vehicle, wherein the method comprises the steps of:
establishing a first communication connection between a control unit and the plurality of vehicles, the control unit is arranged as an onboard component of the third vehicle, wherein the control unit and each of the first, the second and the third vehicle comprising a transceiver, the first communication connection is established between the transceiver of the control unit and the respective transceivers comprised in the plurality of vehicles, and the first communication connection is a wireless network communication,
establishing a second communication connection between the control unit and a safety key, and
instructing, using the control unit, the plurality of vehicles to perform a first mission at the work site,
wherein:
the plurality of vehicles are configured to only perform the first mission while the second communication connection is established between the safety key and the control unit, and
only a single safety key is available for all of the plurality of vehicles arranged at the work site.

8. The method according to claim 7, wherein the plurality of vehicles are further configured to only perform the mission while the first communication connection is established with the control unit.

9. The method according to claim 7, wherein the wherein the plurality of vehicles are further configured to only perform the mission as long as a communication disruption between the first and the second vehicle and the control unit is determined to be less than a predetermined time period.

10. The method according to claim 9, wherein the predetermined time period is between 5 seconds and 5 minutes.

11. A computer program product comprising a non-transitory computer readable medium having stored thereon computer program means for operating a control system adapted to control an operation of a plurality of vehicles, including all of a first, a second and a third vehicle, each of the first, the second and the third vehicle comprising a transceiver, wherein the plurality of vehicles are arranged to operate at a work site, the first and the second vehicle being autonomous vehicles and the third vehicle being a manually operated vehicle, the control system comprising a control unit and a transceiver connected to the control unit, the control system is arranged as an onboard component of the third vehicle, wherein the computer program product comprises:
code for establishing a first communication connection between the transceiver connected to the control unit and each of the respective transceivers comprised in the plurality of vehicles, wherein the first communication connection is a wireless network communication,
code for establishing a second communication connection between the control unit and a safety key, and
code for instructing, using the control unit, the plurality of vehicles to perform a first mission at the work site,
wherein:
the plurality of vehicles are configured to only perform the first mission while the second communication connection is established between the safety key and the control unit, and
only a single safety key is available for all of the plurality of vehicles arranged at the work site.

* * * * *